United States Patent [19]

Smith

[11] 4,292,955

[45] Oct. 6, 1981

[54] SOLAR ENERGY COLLECTOR

[76] Inventor: Harold W. Smith, 37 Moseley Ave., Needham, Mass. 02192

[21] Appl. No.: 880,806

[22] Filed: Feb. 24, 1978

[51] Int. Cl.³ ............................................. F24J 3/02
[52] U.S. Cl. .................................................. 126/417
[58] Field of Search ...................... 126/271, 270, 418

[56] References Cited

U.S. PATENT DOCUMENTS

| | | | |
|---|---|---|---|
| 4,007,728 | 2/1977 | Guba | 126/271 |
| 4,044,949 | 8/1977 | Morawetz et al. | 126/271 |
| 4,062,346 | 12/1977 | Rapp, Jr. et al. | 126/271 |
| 4,062,350 | 12/1977 | Reed | 126/271 |
| 4,062,351 | 12/1977 | Hastwell | 126/418 |

Primary Examiner—Samuel Scott
Assistant Examiner—Wesley S. Ratliff, Jr.
Attorney, Agent, or Firm—Frank A. Steinhilper

[57] ABSTRACT

A solar energy collector includes a housing having a cover transparent to solar energy. A solar energy absorber is enclosed within the housing just beneath the cover. The absorber is formed to define a plurality of narrow fluid channels of triangular cross section which are disposed in close proximity to each other. The triangular cross section fluid channels are defined by a serpentine-shaped metal top sheet which is secured to a flat metallic bottom sheet. The upper ridges of the fluid channels are disposed in proximity to and support the cover. The geometric relation between the fluid channels, the narrow air spaces defined between the fluid channels and the cover is such as to provide a low cost, high efficiency panel.

12 Claims, 3 Drawing Figures

SOLAR ENERGY COLLECTOR

BACKGROUND OF THE INVENTION

This invention relates to solar energy collectors and, more particularly, to improvements in the type of collector which is adapted to convert solar radiation directly to thermal energy in the absorber which, in turn, conducts heat directly to a fluid medium such as water.

In recent years, there have been numerous proposals and attempts to develop and improve solar energy collectors so that their efficiency and cost may approach a level which is economically feasible. While some progress has been made, the efficiency of the collectors in the state of the art still leaves much to be desired. In general, the efficiency of solar energy collectors has been hampered by difficulties encountered with suppressing the substantial portion of absorbed energy escaping by conduction through the transparent cover.

In general, the typical installation includes a plurality of collectors mounted on top of a roof or other portion of a building and connected to the building's heating system or other system adapted to use or store hot water. A collector typically includes a housing which is provided with thermal insulation about its bottom and sides. A cover, which is transparent to solar radiation, is provided on top of the device. A solar energy absorber is disposed within the housing, below the cover, so that it may be exposed to and absorb the solar radiation which passes through the cover. The typical absorber is in the form of a thermally conductive plate, such as an appropriate metal, which may be provided with an absorption-enhancing coating. Attached to or formed integrally with the plate are a plurality of spaced tubes which define comparatively large cross sectional flow channels for the fluid medium such as water. Typically, the tubes are disposed along the absorber plate in a relatively wide spacing, the space between the tubes being a number of times greater than the diameter of the tubes. Most of the impinging solar energy must be absorbed by the intermediate webs of the plate and then conducted through the connective webs to the tubes which are intended to heat the fluid flowing through the tubes.

Among the factors which lead to the hot spots is that the relatively wide webs are relatively thin and therefore present significant resistance to lateral heat transfer to the fluid tubes. In addition, the geometry of the prior devices do not provide optimum heat transfer area between the absorbing surface and the fluid which tends to restrict the rate of heat transfer to the water. Also, the typical prior devices utilize fluid flow channels which are of relatively large cross sectional area and carry relatively large masses of water which reduces the rate of heat transfer at least to those portions of the water contained within the innermost regions of the flow channels.

In general, it is believed the primary difficulty with prior devices had its origin in the designer's idea of the problem, resulting in misplaced emphasis. All prior art "high efficiency" collectors employ some costly modification of the airspace by added material structures, or a vacuum, or use special cover coatings. Such measures have the object of supressing the convection and radiation thermal paths from absorber surface to cover. The idea that better results might be obtained through geometry changes for a very low resistance conductive path to the fluid has not been in evidence.

It is among the objects of my invention to obtain through geometry along the lowest resistance path possible for absorbed energy to reach the circulating fluid, while at the same time holding the cover at the lowest possible temperature, that is near fluid temperature, for lowest cover conduction loss.

SUMMARY OF THE INVENTION

In brief, the present invention includes a housing which includes a surrounding frame and a top cover. The cover is substantially transparent to solar radiation. The housing is thermally insulated across its bottom. A solar energy absorber is disposed within the housing. The absorber is formed from thin sheet material having good heat transfer and corrosion resistance properties. The absorber includes a substantially planar bottom sheet and a top sheet which is formed in an accordion-like, serpentine shape to define a plurality of fluid channels. The fluid channels preferably are of triangular cross section and are spaced in close proximity to each other. The bottom sheet cooperates with the top sheet to define the fluid channels. The cover is disposed in close proximity to the upper ridges of the fluid channels so as to cooperate with the absorber to define a corresponding plurality of narrow air spaces between the sidewalls of each pair of adjacent fluid channels. The cover may be supported directly on the upper ridges of the triangular fluid channels.

The cross sectional flow area defined by each of the fluid channels is quite small as compared to the prior art devices so that each channel may hold only a relatively small mass of fluid, such as water. There are, however, a substantial number of closely spaced flow channels which result in an aggregate flow capacity which is at least equal to if not greater than the typical prior absorber.

The cross sectional geometry of the absorber is such that the area of the top sheet which defines an interface between the water and the solar energy absorbing surface is approximately 125% of the area of the entire device when viewed in plan. In addition, the interface area between the solar energy absorbing surfaces and water is greater than the area of the inner surface of the transparent cover. These geometrical relations originated from recognition that the "film heat transfer coefficient" or conductivity equivalent of the metal to fluid interface was many orders of magnitude lower than conductivity across the thickness of any thin metal. While the present invention uses approximately the same volume of fluid as prior art devices, the fluid to metal interface is on the order of 3 to 7 times greater, which translates into an improvement of the same amount.

The foregoing geometry also leaves an air volume only a bit over twice the water volume and in contact with more absorber area than cover area. The intent is to obtain maximum convection and heat radiation activity, while all prior art devices have sought to suppress it. With high rates of heat transfer between air and absorber surface, and absorber surface to the finely divided water volume, any significant temperature gradient between the cover under surface to the water below is prevented. These elements may be considered as locked together in a substantially isothermal state.

Among the objects of my invention is the creation of an absorber sheet that will operate in an isothermal condition.

Another object is lowering the underside temperature of the transparent cover to the lowest possible temperature, that of the circulating water.

A further object is providing the best possible condition of conductivity between the absorber surface and the water.

Another object is to eliminate the need of a costly selective type coating on the absorber surface.

Another object is the increase in effective absorbtivity of the absorber surface by absorber geometry.

Another object is support of the transparent cover to attain savings from using a thinner cover for any given loading requirement.

Another object is the creation of a panel with the active portion between the outer cover surface to the back of the absorber having a total thickness of less than ⅛". Such thickness allows greater architectural latitude with the frame and insulation becoming part of the structure. It also eliminates side shadow loss.

Another object is to gain the foregoing objectives while at the same time using less material and a simple structure easily adapted to the requirements of volume production techniques.

DESCRIPTION OF THE DRAWINGS

The foregoing and other objects and advantages of the invention will be appreciated more fully from the following further description thereof, with reference to the accompanying drawings wherein.

DESCRIPTION OF THE PREFERRED EMBODIMENT

Figure 1:
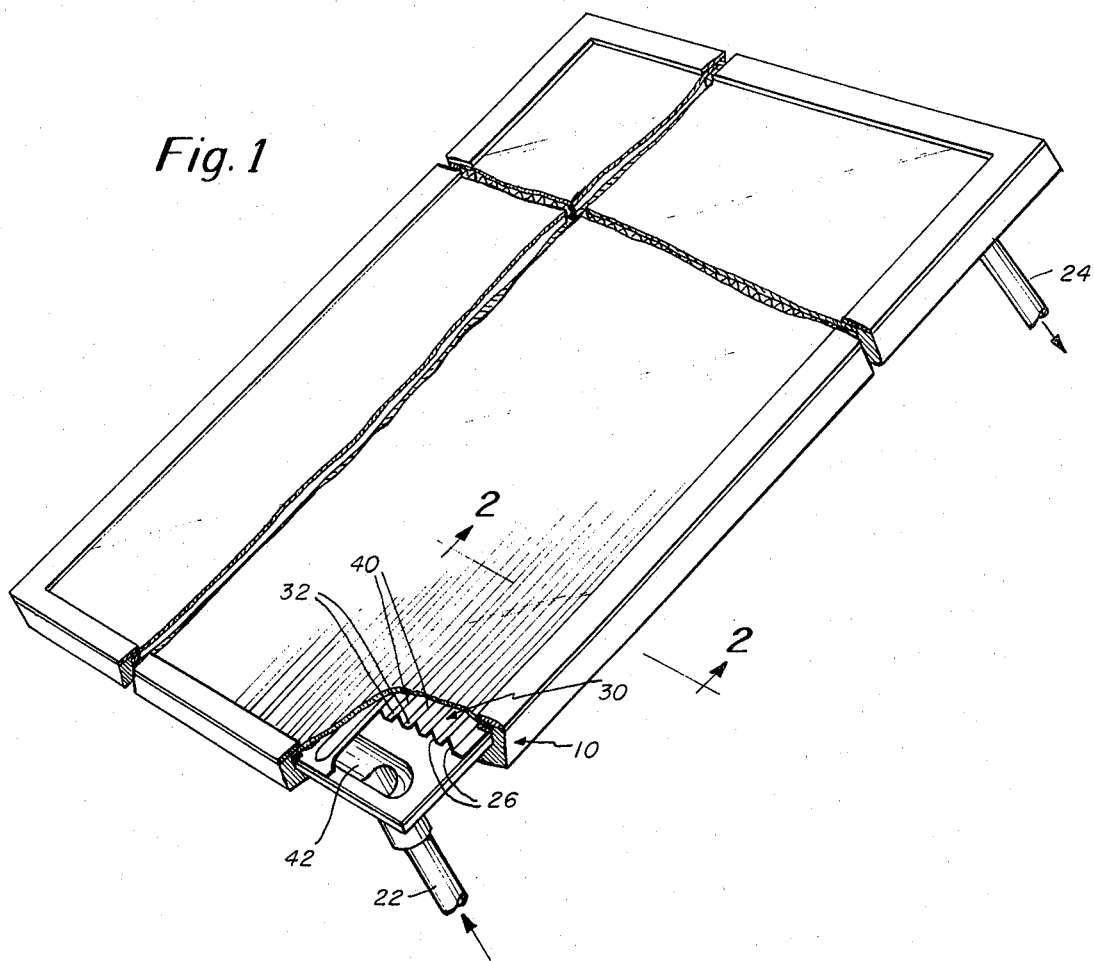
FIG. 1 is an illustration of the solar energy collector, partly broken away.

FIG. 1 shows the general construction of the collector which includes a surrounding frame 10 which may be secured to a building roof or other appropriate support for the device. The frame 10 may be fabricated from a variety of materials such as wood, metal, plastic or the like. The dimensions of the panel may be, for example only, of the order of 4 by 8 feet or such other area as desired. A number of such panels are mounted to a roof and are connected to the heating or storage system in any of a variety of ways, as is well known. It may be noted that irrespective of the planar area defined by the individual collector panels, the thickness of the entire panel typically will be of the order of less than an inch over the thickness of the back insulation. This provides advantages which follow from improved flexibility in installation techniques.

The panel includes a flat support member 12 secured to and contained by the frame 10 which provides support for the absorber. When installed on a roof, the frame 10 may be secured to the roof and insulative material 14 (such as fiberglass insulation) is disposed below the support member 12.

The panel includes a solar energy absorber, indicated generally at 16 and a cover 18 which extends fully over the absorber 16. The cover 18 may be formed from glass or other suitable material which is transparent to solar radiation. A spacer 20 may be provided between the glass cover and the peripheral margin of the absorber and, if desired, the spacer 20 may be formed from a material which has some thermal insulative properties. It should be noted, however, that because of the relatively thin construction of the panel, heat losses through the side edges of the panel are very low and insulation about the side edges is not critical and may even be omitted. In a typical installation, the device will be disposed at an incline so as to face the solar radiation. Inlet and outlet conduits 22, 24 are provided to communicate a fluid, such as water, to and from the device so that it may carry away heat from the absorber 16 to a storage tank or the like.

Figure 2:
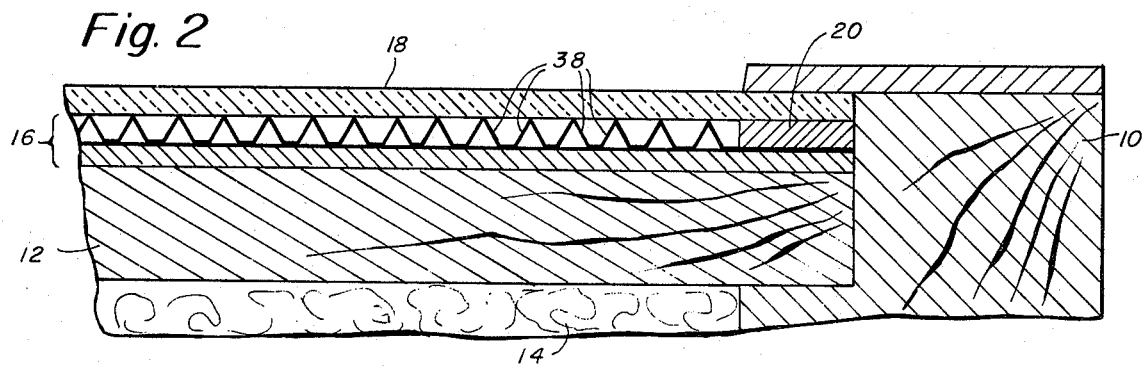
FIG. 2 is a cross sectional illustration of the collector shown in FIG. 1 as seen along the line 2—2 of FIG. 1.
Figure 3:
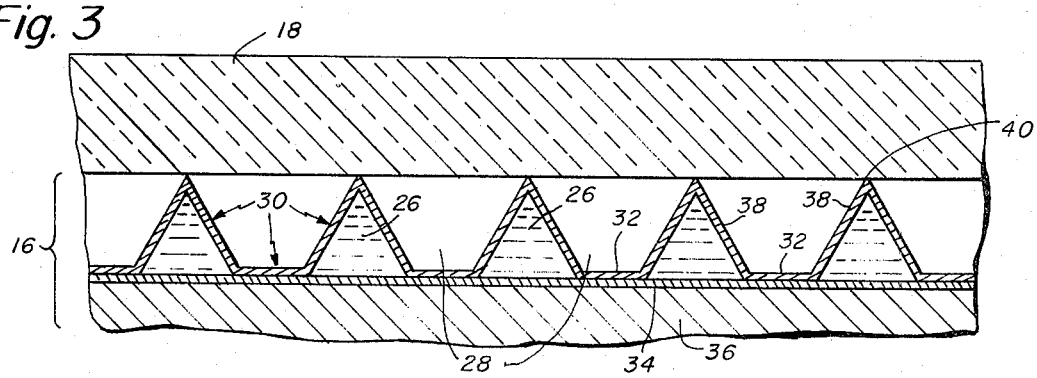
FIG. 3 is an enlarged cross sectional illustration of a portion of the collector as illustrated in FIG. 2.

As shown in FIGS. 2 and 3, the absorber 16 is formed from thin sheet material, preferably a metal having a high corrosion resistance and heat transfer properties, for example, copper. The absorber is formed to define a multiplicity of alternating fluid channels 26 and air spaces 28. The channels 26 and spaces 28 are defined by the absorber construction which includes an accordionlike, serpentine top sheet 30 which is formed to define a plurality of inverted V-shaped fluid channels 26 spaced by relatively narrow web segments 32. The top sheet is attached firmly, such as by brazing or soldering, to a substantially flat bottom sheet 34 which is preferably formed from the same material as the top sheet 30. As will be described, the sheet material is thin and it is desirable to provide a firm substrate or base for the bottom sheet 34, as indicated at 36. The substrate 36 may be a composition to which the bottom sheet 34 may have been previously laminated, for example, in the manner that electronic printed circuit boards are manufactured. The preformed top sheet 30 is attached to the bottom sheet 34, with the substrate 36 providing a firm support during attachment.

From the foregoing, it will be appreciated that the fluid channels 26 are defined by cooperation of the top sheet 30 and bottom sheet 34 and, in the illustrative embodiment, the fluid channels are triangularly shaped. Each of the channels 26 may be considered as being defined by a pair of sidewalls 38 which terminate in a relatively narrow ridge 40. The top sheet 30 is formed so that the channels 26 will be disposed in proximity to each other just sufficient to provide the intermediate web 32 to facilitate secure heat conductive attachment of the top and bottom sheets 30, 34. The fluid channels 26 preferably are in parallel and are in communication, at their opposite ends, with the inlet and outlet conduits 22, 24, for example, by an inlet manifold 42, and an outlet manifold (not shown).

In the preferred embodiment of the invention, the cover 18 is disposed so that it may rest directly on the ridges 40 of the top sheet 30. The ridges 40 preferably are substantially disposed in a common plane. This provides a number of advantages in that it provides for regular and uniform support of the cover 18 by the absorber 16 itself. The load of the cover 18 (as well as any additional loads imposed by reason of weather conditions) is distributed uniformly over the large number of ridges 40. In addition to these structural advantages, the proximate location of the cover 18 with respect to the absorber 16 also reduces the volume of the air spaces 28 which, as described below, enhances the thermal efficiency of the device. The air spaces 28 preferably do not include a volume which is substantially greater than approximately twice the volume of the fluid channels 26.

By way of more specific example, the absorber may be formed from 0.010" sheet copper. The cross sectional configuration of the absorber may include sidewalls 38 for each of the fluid channels 26 which are of the order of 0.100" long (as viewed in cross section in FIG. 3). The bottom wall of the channel 26, which is defined by the bottom sheet 34 may also be of the order of 0.100" long, the geometry of the fluid channels 26 thus defining an equilateral triangle. The width of the web 32 may be of the order of 0.050". The height of the triangular fluid channels 26 thus is of the order of 0.087". The thickness of the cover 16 preferably is no less than the height of the fluid channels 32 and, in the illustrative example, may be of the order of 0.100" thick. From the foregoing, it will be appreciated that there will be approximately 80 fluid channels 26 per foot of absorber width.

Among the aspects of the invention which contribute to its advantages is that the cross sectional areas of the flow channels 26 as well as the air spaces 28 are relatively small as compared to prior art absorbers. Each channel 26 and space 28 contain a small mass of water or air, respectively. For example, in the foregoing illustrative embodiment, the cross sectional area of each air space 28 is of the order of 0.0087 square inch and the cross sectional area of each fluid channel 26 is of the order of 0.004 square inches. In addition, the area of fluid channel interface under the thin absorber top sheet 30 is approximately 125% of the area defined by the cover 18 when viewed in plan. This is a comparatively large ratio of the direct interface of energy absorbing surface area to fluid flow surface area, than is the case with prior art devices which contributes to the high rate of heat transfer to the water. This, coupled with the relatively small mass of water contained within each flow channel, enables the water to absorb heat from the absorber surfaces at a rapid rate. When such a small volume of air is interdigitated with a very efficient water cooled heat sink within a space on the order of 0.1 inch thick, neither the air nor the under surface of the cover 18 are able to maintain any significant temperature rise above that of the circulating water. A thermal state free from temperature gradients may be called an isothermal condition, and in the present invention provides the minimum possible conduction loss through the cover 18.

Since essentially all heat lost from solar panels is by conduction through the cover, the minimum possible loss would be with the minimum possible temperature on the cover under surface. Of course the minimum temperature to be found inside any solar panel must be that of the circulating water.

By contrast all known prior art starts with less efficient absorbers having hot spots heating an air cavity. Due to their operating position, and despite any preventative measures, thermal gradients do form within these devices with the highest temperatures occuring just under the cover.

It should be understood that although the invention has been described with respect to the foregoing preferred embodiment in which the flow channels are triangular, the principles of the invention may be incorporated into other configurations for the absorber fluid channels 26. For example, the sidewalls 38 of the flow channels could be somewhat arcuate provided that they terminate in a relatively narrow upper ridge 40. In each instance, the upwardly and inwardly extending configuration of the sidewalls 38 defines an inside corner which will tend to promote absorption of the solar energy which may have been reflected from a sidewall 38. Also, in each, the direct interface are (e.g., the sidewalls 38) is greater than the area of the corner, and the width of the flow channels 26 (at least at their base) is greater than the width of the air spaces 28 at their base.

It should be understood that the foregoing description of the invention is intended merely to be illustrative thereof and that other embodiments and modifications may be apparent to those skilled in the art without departing from its spirit.

Having thus described the invention, what I desire to claim and secure by Letters Patent is:

1. A solar energy panel comprising
   a frame having an aperture therein adapted to face the sun,
   a continuous base member supported in said frame,
   a solar energy absorber supported in said frame against said base member and adapted to be exposed to the sun's radiation through said aperture,
   said absorber being formed of a thin, heat conducting sheet material of high corrosion resistance formed into a convoluted absorber member which, together with said base member, defines walls of a multiplicity of fluid channels of small cross section positioned close to one another,
   each of said channels including a pair of upwardly converging side walls of said absorber sheet material, said side walls thereby adapted to absorb most of the sun's radiation which enters said aperture and reflect substantially all of the remainder away from said aperture,
   fluid inlet and outlet means connected to said channels to enable fluid to flow to and through said channels,
   a cover member substantially transparent to solar radiation positioned across said aperture and in close proximity to said absorber to define small air spaces between said cover and adjacent fluid channels,
   said fluid channels being spaced in proximity to each other such that the aggregate area defined by the inner surfaces of the walls of the channels as formed by the absorber member is substantially greater than the area of the frame aperture.

2. A solar energy panel as defined in claim 1 wherein the fluid channels are triangular in cross section.

3. A solar energy panel as defined in claim 1 in which the absorber forming the walls of said fluid channels forms ridges substantially equidistant from said base sheet and substantially in a plane; and
   said cover member rests against said absorber.

4. A solar energy panel as defined in claim 1 further comprising:
   the volume defined by the air space between adjacent fluid channels being not substantially greater than approximately twice the volume defined within one of the fluid channels.

5. A solar energy panel as defined in claim 4 wherein the cross sectional area defined by each of the air spaces is of the order of 0.008 square inches.

6. A solar energy panel as defined in claim 1 wherein the thickness of the cover panel is approximately equal to the height of the fluid channels.

7. A solar energy panel as defined in claim 1 wherein the cross sectional dimensions of the fluid channels and the air spaces are sufficiently small to minimize the formation of temperature gradients therein, thereby maintaining each of fluid and air in a substantially isothermal state.

8. A solar energy panel as defined in claim 1 further comprising:
said sheet material of the absorber comprising copper;
said flat continuous base sheet comprising a thin film of copper laminated to a supporting substrate of substantially greater thickness to provide support for said base sheet.

9. A solar energy panel as defined in claim 1 wherein the width of the fluid channels, at their lower region, is greater than the width of the air spaces at their lower region.

10. A solar energy panel as defined in claim 1 wherein the direct interface defined by the sidewalls defines a greater area than that of the panel when viewed in plan.

11. A solar energy panel comprising:
a frame;
a solar energy absorber supported by the frame and being formed from thin sheet material having a high corrosion resistance, said absorber further comprising a flat, continuous base sheet; a top sheet of serpentine cross-sectional configuration positioned against the surface of the base sheet to define a plurality of fluid channels, each of said fluid channels including a pair of upwardly and inwardly extending sidewalls which define, on their outwardly facing surfaces, radiation absorbing surfaces and, on their inner surfaces, heat transfer surfaces;
the area defined by said sidewalls being greater than one half of the total area which defines the flow channels, said sidewall surfaces defining an area greater than the surface of the panel when viewed in plan;
fluid inlet and outlet conduit means connected to said channels to enable fluid to flow to and through the fluid channels;
a cover member formed from a material which is substantially transparent to solar radiation, said cover being mounted to the frame over and in enclosing relation to the absorber.

12. A solar energy panel comprising
a frame,
a continuous base copper sheet supported in said frame
a solar energy absorber supported by said frame and base sheet said absorber being formed of a thin, copper convoluted absorber which, together with said base sheet, defines walls of a multiplicity of fluid channels of small triangular cross section,
the apexes of said fluid channels residing substantially in a plane above said base sheet,
fluid inlet and outlet conduit means connected to said channels to enable fluid to flow to and through the fluid channels,
a glass cover member substantially transparent to solar radiation positioned against the apexes of said absorber to define relatively small air spaces between said cover and adjacent fluid channels, whereby the surface of said absorber, the air in said air spaces and the under surface of said cover are nearly isothermal,
said fluid channels being spaced in proximity to each other such that the area of the inner surfaces of the sidewalls of the fluid channels is substantially greater than the overall area defined by the absorber when viewed in plan.

* * * * *

UNITED STATES PATENT AND TRADEMARK OFFICE
CERTIFICATE OF CORRECTION

PATENT NO. : 4,292,955
DATED : Oct. 6, 1981
INVENTOR(S) : Harold W. Smith

It is certified that error appears in the above-identified patent and that said Letters Patent are hereby corrected as shown below:

Column 2, line 4, "along" should read: ---alone---.

Signed and Sealed this

Nineteenth Day of January 1982

[SEAL]

Attest:

GERALD J. MOSSINGHOFF

Attesting Officer

Commissioner of Patents and Trademarks